United States Patent
Atkins

(10) Patent No.: US 6,357,840 B1
(45) Date of Patent: Mar. 19, 2002

(54) ALGORITHM FOR TESTING ROAD SURFACE WITH A SMALL PRESSURE RELEASE IN AN ANTI-LOCK BRAKE SYSTEM

(75) Inventor: Thomas M. Atkins, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/471,727

(22) Filed: Dec. 23, 1999

Related U.S. Application Data

(63) Continuation of application No. PCT/US98/13274, filed on Jun. 26, 1998
(60) Provisional application No. 60/051,117, filed on Jun. 27, 1997.

(51) Int. Cl.$^7$ .................................... B60T 8/66
(52) U.S. Cl. ............... 303/149; 303/113.1; 303/175
(58) Field of Search ..................... 303/113.1, 138, 303/148, 149, 150, 156, 160, 175

(56) References Cited

U.S. PATENT DOCUMENTS

| 4,418,966 A | 12/1983 | Hattwig |
| 4,668,023 A | 5/1987 | Every et al. |
| 4,673,226 A | 6/1987 | Every et al. |
| 4,790,607 A | 12/1988 | Atkins |
| 4,865,399 A | 9/1989 | Atkins et al. |
| 4,881,784 A | 11/1989 | Leppek |
| 4,886,332 A | 12/1989 | Atkins |
| 5,092,662 A | * 3/1992 | Okubo .................... 303/106 |
| 5,419,623 A | 5/1995 | Weber |
| 6,193,327 B1 | * 2/2001 | Atkins .................. 303/113.1 |

FOREIGN PATENT DOCUMENTS

DE 19545012 A 6/1997

* cited by examiner

Primary Examiner—Christopher P. Schwartz
(74) Attorney, Agent, or Firm—MacMillan, Sobanski & Todd, LLC

(57) ABSTRACT

Upon detection of a potential transition from a low mu road surface to a high mu road surface, a rear wheel anti-lock brake system generates one dump pulse to increase the braking effort of the controller rear wheel as a test of the road surface. If the wheel accelerates following the test pulse, the transition is false and the anti-lock brake system continues as before. If the wheel does not accelerate following the test pulse, the transition is true and the anti-lock brake system proceeds to increase the braking effort of the controlled wheel brake.

11 Claims, 5 Drawing Sheets

ALGORITHM FOR TESTING ROAD SURFACE WITH A SMALL PRESSURE RELEASE IN AN ANTI-LOCK BRAKE SYSTEM

CROSS REFERENCE TO RELATED APPLICATIONS

This application claims the benefit of U.S. Provisional Application No. 60/051,117, filed Jun. 27, 1997 and is a continuation of International Patent Application No. PCT/US98/13274 filed Jun. 26, 1998.

BACKGROUND OF THE INVENTION

This invention relates in general to anti-lock brake systems and in particular an algorithm for testing the road surface with a small pressure release.

An Anti-lock Brake System (ABS) is often included as standard or optional equipment on new vehicles. When actuated, the ABS is operative to control the operation of some or all of the vehicle wheel brakes. One type of ABS controls only the vehicle rear wheel brakes. Such a system is referred to as a RWAL in the following.

A typical prior art RWAL is illustrated at 10 in FIG. 1. As shown in FIG. 1, the RWAL 10 is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through a hydraulic line 16b to a conventional combination or proportioning valve 18. The combination valve 18 includes a first output line 18a adapted to supply hydraulic fluid at a first predetermined pressure to actuate a pair of vehicle front wheel brakes 19a and 19b. The combination valve 18 also includes a second output line 18b which supplies hydraulic fluid at a second predetermined pressure to actuate a pair of vehicle rear wheel brakes 20a and 20b.

The RWAL 10 shown in FIG. 1 utilizes a control valve 21 to selectively control the application of pressure to the rear wheel brakes 20a and 20b when the system is in an anti-lock braking mode. The control valve 21 includes a normally open solenoid valve 22 connected between the line 18b and a line 24 which supplies pressurized brake fluid to the controlled rear wheel brakes 20a and 20b. During an anti-lock braking cycle, the normally open valve 22 isolates the rear wheel brakes 20a and 20b from the master cylinder 14 and is commonly referred to as an isolation valve. The isolation valve 22 also can be selectively opened to increase the pressure at the rear wheel brakes 20a and 20b.

The control valve 21 also includes a normally closed solenoid valve 26, which is connected between the line 24 and a fluid accumulator 28. The normally closed valve 26 is commonly referred to as a dump valve. The dump valve 26 is selectively opened to reduce the pressure at the rear wheel brakes 20a and 20b by bleeding brake fluid from the rear wheel brakes to the accumulator 28. In the RWAL 10, the master cylinder 14 provides a source of pressurized hydraulic brake fluid during an anti-lock braking cycle, thus eliminating the need for a separate source of pressurized hydraulic fluid, such as a motor driven pump, which is usually included in a four wheel ABS.

The RWAL 10 further includes a computer control module 30 which is electrically connected to a wheel speed sensor 40. The control module 30 can be mounted directly upon the control valve 21 or located remotely therefrom. The control module 30 includes a RWAL microprocessor (not shown) which is programmed to control the RWAL 10 in accordance with a RWAL control algorithm and parameters permanently stored in a Read Only Memory (ROM). The RWAL microprocessor also can access a Random Access Memory (RAM) for temporary storage and retrieval of data. A detailed description of the RWAL illustrated in FIG. 1 is included in U.S. Patent Nos. 4,790,607 and 4,886,322.

During vehicle operation, the microprocessor in the RWAL control module 30 continuously receives speed signals from the wheel speed sensor 40. The RWAL microprocessor monitors the speed signals for potential rear wheel lock-up conditions. When the vehicle brakes are applied and the RWAL microprocessor senses a first rear wheel speed departure, which is indicative of an impending wheel lock-up condition, the RWAL microprocessor is responsive thereto to close the isolation valve 22 to isolate the rear wheel brakes 20a and 20b from the master cylinder 14. The RWAL microprocessor then selectively opens the dump valve 26 to reduce the pressure applied to the rear wheel brakes 20a and 20b and thereby correct the rear wheel speed departure. Once the wheel speed departure has been corrected and the controlled wheel has spun up to the vehicle speed, the microprocessor opens the isolation valve 22 to initiate a second wheel speed departure.

The operation of the RWAL 10 is illustrated by the graphs shown in FIG. 2. The upper solid curve labeled 60 represents the velocity of the rear wheels while the dashed curve labeled 61 represents the vehicle velocity. The operation of the isolation valve 22 and the dump valve 26 is illustrated by the curves labeled 62 and 63, respectively. The lower curve, which is labeled 64, shows the pressure applied to the controlled rear wheel brakes.

During an anti-lock braking cycle, the first and second wheel speed departures are labeled 60a and 60b, respectively. Following correction of the second wheel speed departure, which occurs at time $t_7$, the rear wheel brake pressure is maintained at a constant level $P_e$. If the vehicle transitions from a low mu to a high mu surface, the braking effort exerted by the rear wheels can be increased. Such a transition is detected when the RWAL microprocessor senses an increased deceleration of the vehicle caused by the uncontrolled front wheel brakes 19a and 19b. Accordingly, it is known to generate a series of reapply pulses 62b which reopen the isolation valve 22. The increased pressure initiates a third wheel speed departure, which is labeled 60c in FIG. 2. At time $t_{10}$, a dump pulse is generated to open the dump valve 26 to reduce the rear wheel brake pressure to a level $P_g$ to correct the third rear wheel departure. Thereafter, the rear wheel brake pressure is held at the level $P_g$, which is greater than the previously held level $P_e$. It is further known to generate a fourth wheel speed departure, which is labeled 60d in FIG. 2, to assure that optimum rear wheel braking is provided. The fourth wheel speed departure results in the rear wheel brake pressure being further increased to $P_h$ which is greater than $P_g$.

SUMMARY

This invention relates to an algorithm for testing the road surface with a small pressure release.

As described above, it is known to cause a pair of rear wheel speed departures in a RWAL, during which the actual rear wheel speed drops below the actual vehicle speed, when a transition of the vehicle from a low to a high road surface mu is detected. A pair of such generated wheel speed departures are shown in FIG. 3A. During anti-lock braking cycles on very low mu surfaces, such as surfaces having a mu which is less than 0.3, it has been observed that the rear vehicle wheels can experience a gradual wheel speed departure while the rear wheel brake pressure is held constant. These wheel speed departures are commonly referred to as "wheel speed sneakdown" and are well under the 1.3 g deceleration threshold used to trigger an anti-lock braking cycle. A wheel speed sneakdown condition is illustrated at 70 in FIG. 3B. Because the slowing of the actual wheel speed below the actual vehicle speed under wheel speed sneakdown conditions is similar to the reaction of the rear wheels when the vehicle transitions from a low to high mu road surface, the wheel speed sneak down can be misinterpreted by the RWAL microprocessor as a transition from a low mu road surface to a high mu road surface. Accordingly, the RWAL microprocessor may react to the wheel speed sneak down condition by initiating forced wheel speed departures, as also illustrated in FIG. 3B. However, since the vehicle has not transitioned to a higher mu surface, the forced wheel speed departures would deplete the limited amount of pressurized brake fluid available from the master cylinder without a corresponding increase in braking effort. Accordingly, it would be desirable to verify that the mu of the road surface has actually increased before initiating the wheel speed departures.

The present invention contemplates an anti-lock brake system for a vehicle having at least one rear wheel brake connected to a master cylinder. The anti-lock brake system includes an isolation valve connected between the master cylinder and the controlled wheel brake and a dump valve connected to the rear wheel brake. Additionally, the system has a speed sensor for monitoring the speed of a rear wheel associated with the controlled rear wheel brake. The system further includes a controller electrically coupled to the isolation dump valves and the speed sensor. The controller being operative, upon detecting a potential lock-up condition of the vehicle wheel associated with the controlled wheel brake, to selectively operate the isolation and dump valves to correct the potential wheel lock-up condition. Following correction of said potential lock-up condition, the controller is further operative to selectively open the dump valve and monitor the rear wheel speed to determine whether the vehicle has actually transitioned form a low mu road surface to a high mu road surface.

The speed of the controlled wheel speed is monitored for an absence of acceleration, which is indicative that the vehicle has transitioned from a low mu to a high mu road surface. Upon verification of a low to high mu transition, the controller is operative to cause and correct at least one wheel speed excursion. Following correction of the wheel speed excursion, the braking effort of the controlled rear wheel brake will be greater than before the wheel speed excursion.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
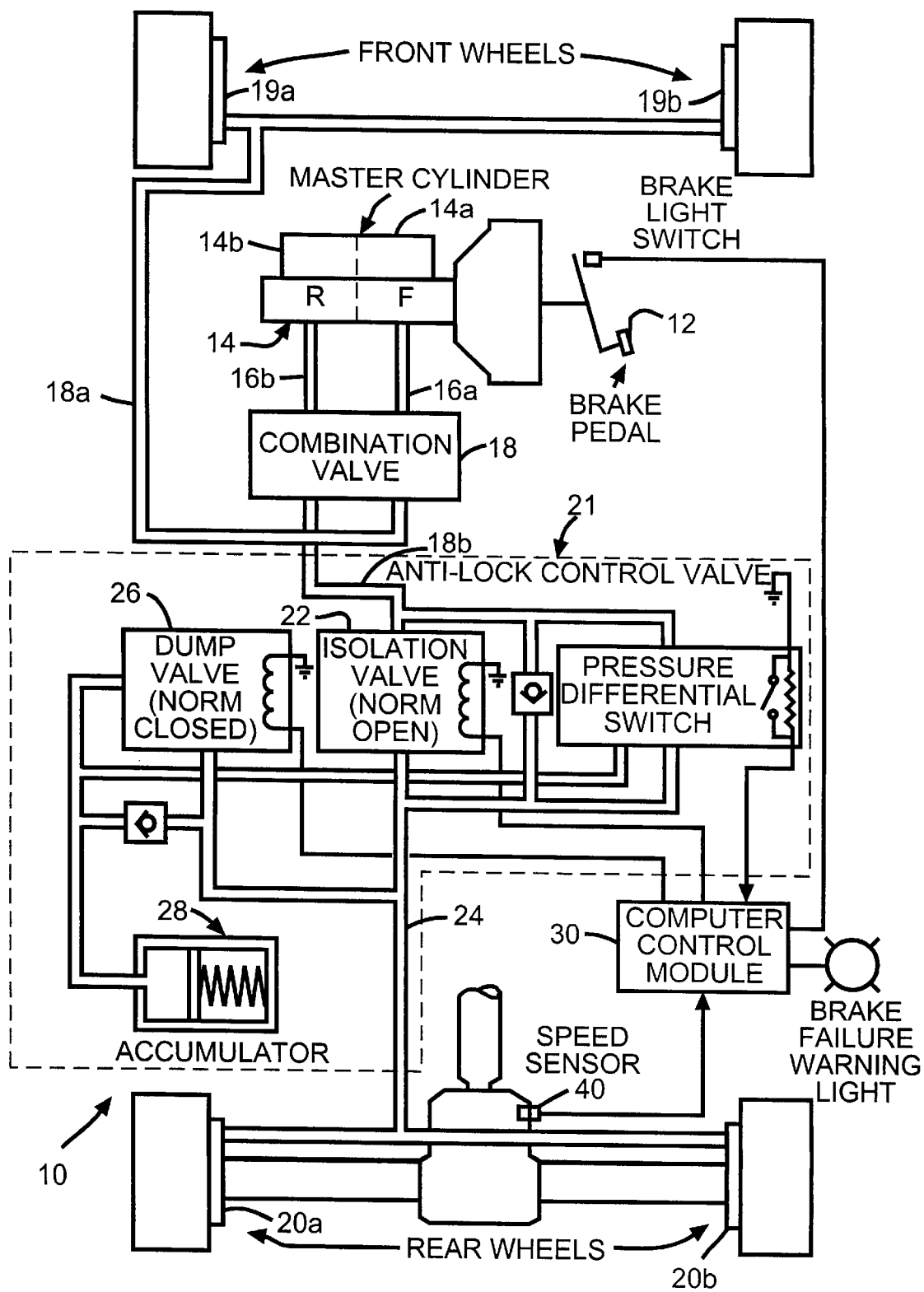
FIG. 1 is a schematic diagram of a prior art rear wheel anti-lock brake system.
Figure 2:
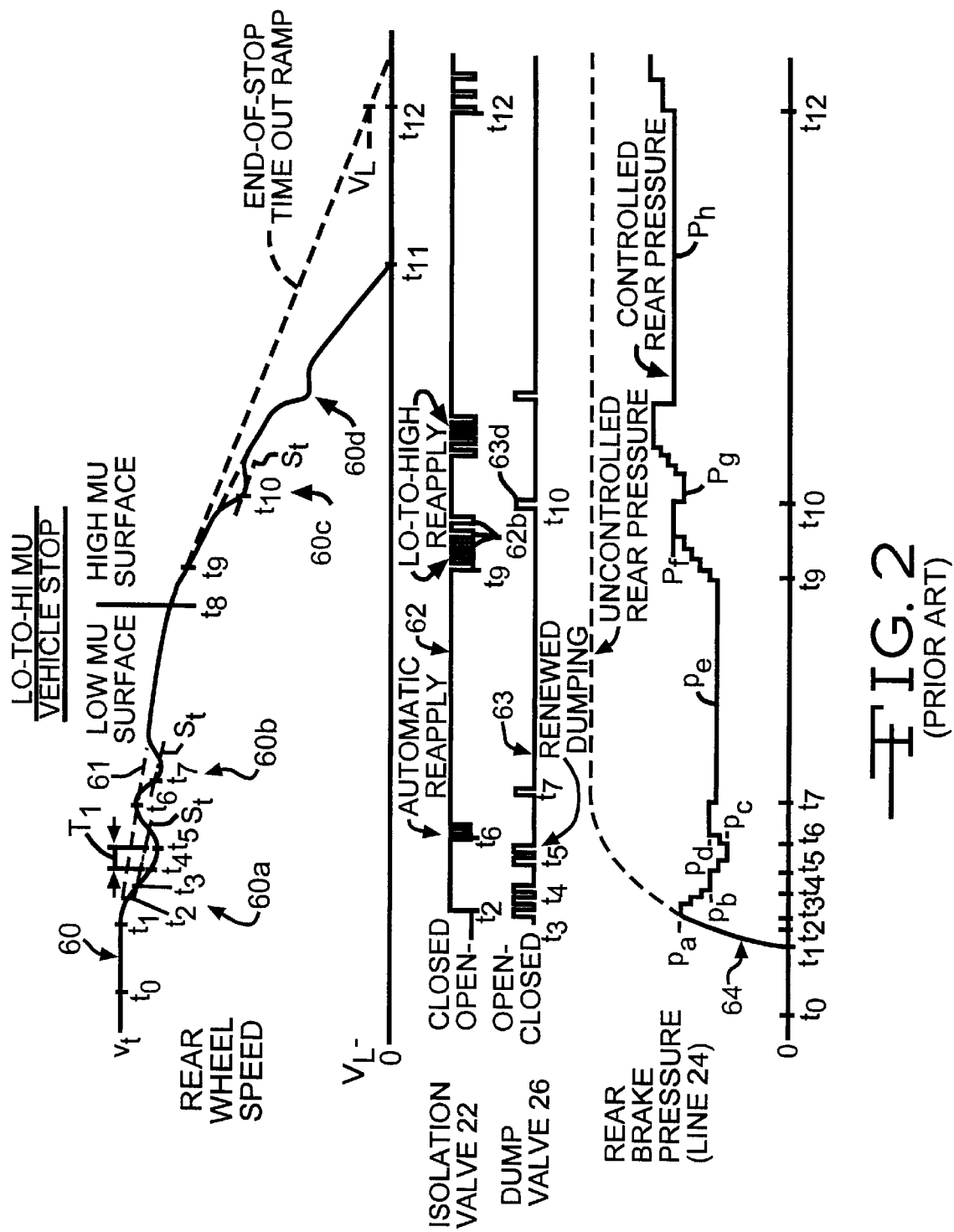
FIG. 2 illustrates the operation of the rear wheel anti-lock brake system shown in FIG. 1.
Figure 3A:
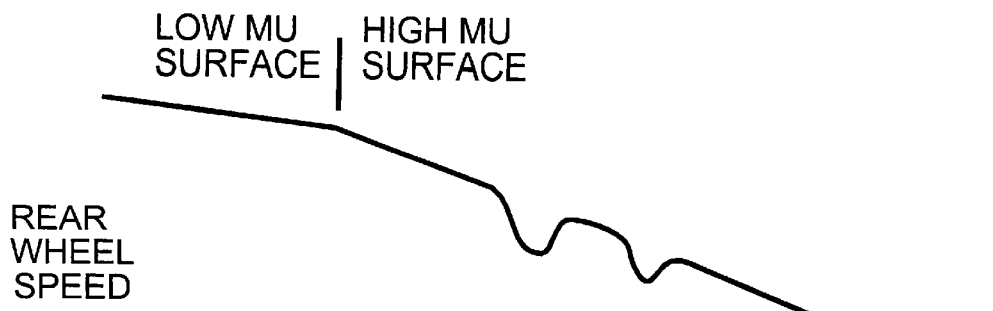
FIG. 3A is a wheel speed vs. time graph illustrating operation of the system shown in FIG. 1 when the vehicle transitions from a low mu road surface onto a high mu road surface.
Figure 3B:
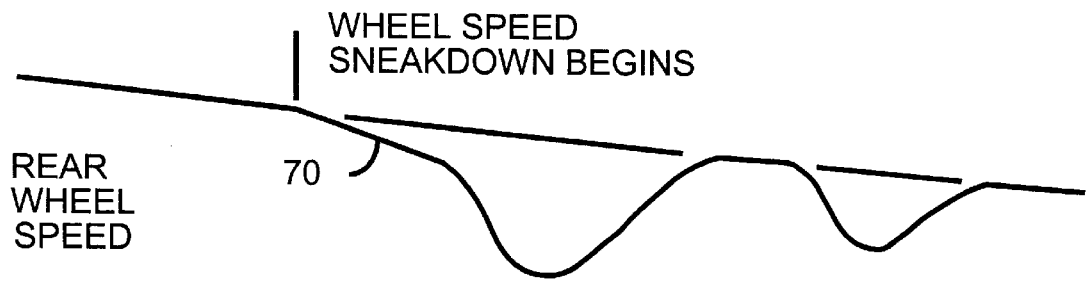
FIG. 3B is a wheel speed vs. time graph illustrating wheel speed sneakdown.
Figure 3C:
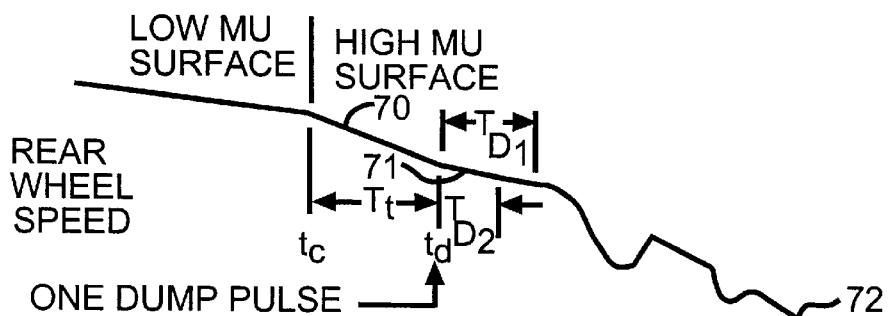
FIG. 3C is a wheel speed vs. time graph illustrating operation of a rear wheel anti-lock brake system in accordance with the present invention when the vehicle transitions from a low mu road surface onto a high mu road surface.
Figure 3D:
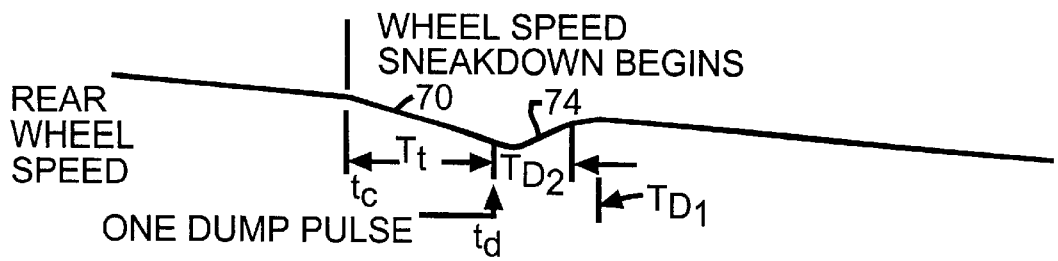
FIG. 3D is a wheel speed vs. time graph illustrating operation of a rear wheel anti-lock brake system in accordance with the present invention with wheel speed sneakdown present.

The present invention contemplates applying a single dump pulse following detection of an increased deceleration of the vehicle during an anti-lock braking cycle to verify that a transition from a low to high mu road surface has actually occurred. Referring again to the drawings, there is shown, in FIG. 3C, a rear wheel speed vs. time graph which illustrates the invention. At time $t_c$, the deceleration of the controlled rear wheel begins to increase, as shown by the change in slope of the portion of the rear wheel speed curve labeled 70. As described above, the change in slope can be due to either a vehicle transition from a low mu to a high mu road surface or wheel speed sneak down. The operation of the invention for the former condition is illustrated, in FIG. 3C while the operation of the invention is illustrated in FIG. 3D.

The RWAL microprocessor samples the speed of the controlled rear wheel during every iteration. In the preferred embodiment, the sampling occurs every 300 milliseconds; however, it will be appreciated that other sampling rates can be utilized. The RWAL microprocessor compares the sampled wheel speed to a previously sampled wheel speed and calculates the rate of change, or deceleration, of the rear wheel speed. If the deceleration is greater than a predetermined threshold, which is selected for the particular vehicle platform, the RWAL microprocessor will cause one short test dump pulse to be generated to determine if the vehicle has transitioned from a low mu to a high mu road surface. As shown in FIG. 3C, the test dump pulse is generated at $t_d$. Following the test pulse, the slope of the deceleration of the controlled rear wheel decreases slightly, as shown by the portion of the rear wheel speed curve labeled 71 in FIG. 3C. The time period between the time period $T_t$ between the time of transition $t_c$ and the time for generating the test pulse $t_d$ will vary, depending upon when the transition occurs with the iteration period of the RWAL microprocessor. However, the time period $T_t$ will be no more than one microprocessor iteration period, which, in the preferred embodiment is 300 milliseconds.

After the test dump pulse has been generated, the subroutine continues to monitor the controlled rear wheel for acceleration for a first predetermined time period $T_{D1}$. In the preferred embodiment, the first predetermined time period $T_{D1}$ is 150 milliseconds; however, it will be appreciated that the invention also can be practiced with other time periods for $T_{D1}$.

If rear wheel acceleration is detected following the test dump pulse, the RWAL microprocessor confirms continuing acceleration by sampling the wheel speed again after a second predetermined time period $T_{D2}$ has elapsed. In the preferred embodiment, the second predetermined time period $T_{D2}$ is 50 milliseconds; however, it will be appreciated that the invention also can be practiced with other time periods for $T_{D2}$. After $T_{D2}$ has elapsed, the RWAL microprocessor determines if the controlled rear wheel is continuing to accelerate.

If the controlled rear wheel is not continuing to accelerate, it is an indication that the first acceleration was caused by a non-road surface transition condition, such as, for example, the controlled rear wheel striking a bump in the road. Accordingly, the RWAL microprocessor will then continue to monitor the controlled rear wheel for acceleration for the remainder of the first predetermined time period $T_{D1}$.

If the controller does not detect a continuing wheel acceleration during the first predetermined time period $T_{D1}$, the indication of a transition from a low to a high mu road surface is true. Accordingly, the RWAL microprocessor will proceed to generate a pair of forced wheel speed departures, as is shown in FIG. 3C. As shown by the portion of the rear wheel speed curve labeled 72 in FIG. 3D, the slope of the curve is increased following the forced wheel speed departures, which is indicative of increased vehicle braking effort. It will be appreciated that, while two wheel speed departures are described and illustrated for the preferred embodiment, the invention also can be practiced with more or less speed departures following confirmation of a low to high mu surface transition.

If rear wheel acceleration is detected during the first predetermined time period $T_{D1}$, and the acceleration continues for the second predetermined time period $T_{D2}$, as illustrated in FIG. 3C, the RWAL microprocessor concludes that the vehicle is experiencing wheel speed sneakdown and the vehicle has not transitioned from a low to high mu road surface. Accordingly, the RWAL microprocessor will not generate the pair of wheel speed departures shown in FIG. 3A. Instead, the wheel will be allowed to return to the condition which existed before the test pulse was generated.

For a small delay in implementing the forced wheel speed departures, the present invention verifies that a low to high mu road surface transition has truly occurred. The present invention reduces brake fluid consumption on a slippery surface while providing better wheel speed control. Additionally, once a true low to high mu road surface transition has been identified, a more aggressive reapply strategy can be followed.

Figure 4:
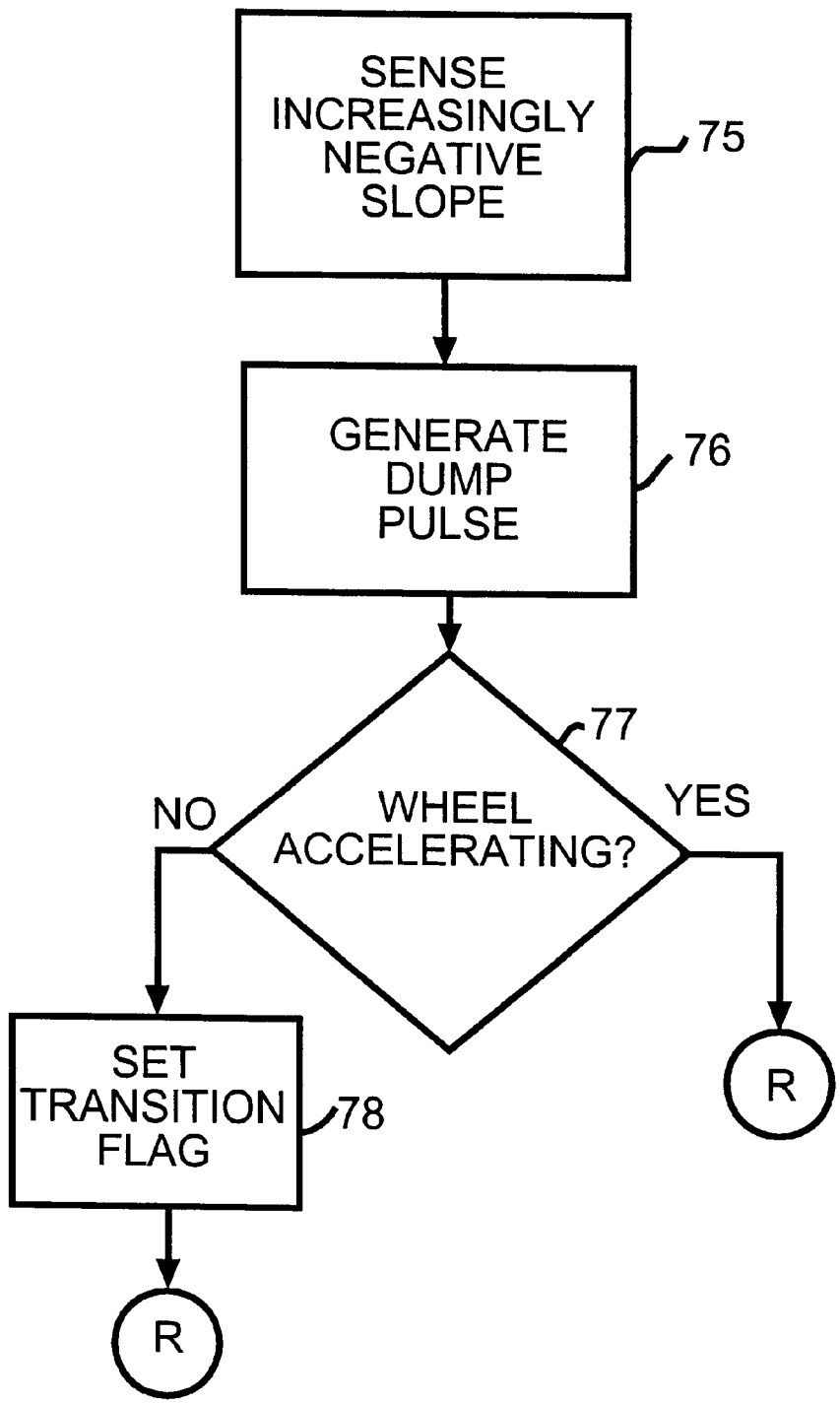
FIG. 4 is a flow chart for a subroutine to implement the present invention.

A flow chart for a vehicle deceleration subroutine for implementing the present invention is shown in FIG. 4. The subroutine is included as a portion of a RWAL control algorithm. The subroutine is called during each iteration of the main RWAL system control algorithm. It will be appreciated that the subroutine shown in FIG. 4 is intended to be exemplary and that the invention can be implemented with other subroutines which differ from the structure shown in the flow chart in FIG. 4. Additionally, some of the functions shown in the flow chart may be included in the RWAL control algorithm. Similarly, it will be appreciated that the invention also can be practiced with a plurality of subroutines which are called by the RWAL control algorithm.

Because the curve for the controlled rear wheel speed retains a negative slope throughout a normal anti-lock brake cycle, the subroutine is operative to monitor the wheel speed curve for a positive slope which is shown in FIG. 3D and is indicative of a wheel speed sneakdown condition. In functional block 75, the subroutine checks for an increasingly negative slope of the rear wheel speed curve, as occurs at $t_c$ in FIGS. 3C and 3D. In the preferred embodiment, the slope is subtracted from a previously calculated slope and the difference compared to a predetermined slope threshold. If the difference is greater than the slope threshold, the subroutine continues to functional block 76 where the test dump pulse is generated.

The subroutine then monitors the controlled rear wheel speed and continues to calculate the associated rate of change of the wheel speed. The rate of change of the controlled rear wheel is checked in decision block 77. If the rear wheel is not accelerating, the condition illustrated in FIG. 3C exists and an actual low to high surface mu transition has occurred. Accordingly, the subroutine transfers to functional block 78 to set a transition flag. The subroutine then returns to the RWAL control program. The RWAL control algorithm is responsive to a set transition flag to generate a series of rear wheel departures as described above. Following the wheel speed departures, the braking torque of the rear wheel brakes will be greater than before the rear wheel departures.

If the wheel is accelerating in decision block 77, the condition illustrated in FIG. 3D exists and an actual low to high surface mu transition has not occurred. Accordingly, the subroutine returns to the RWAL control program.

Figure 5:
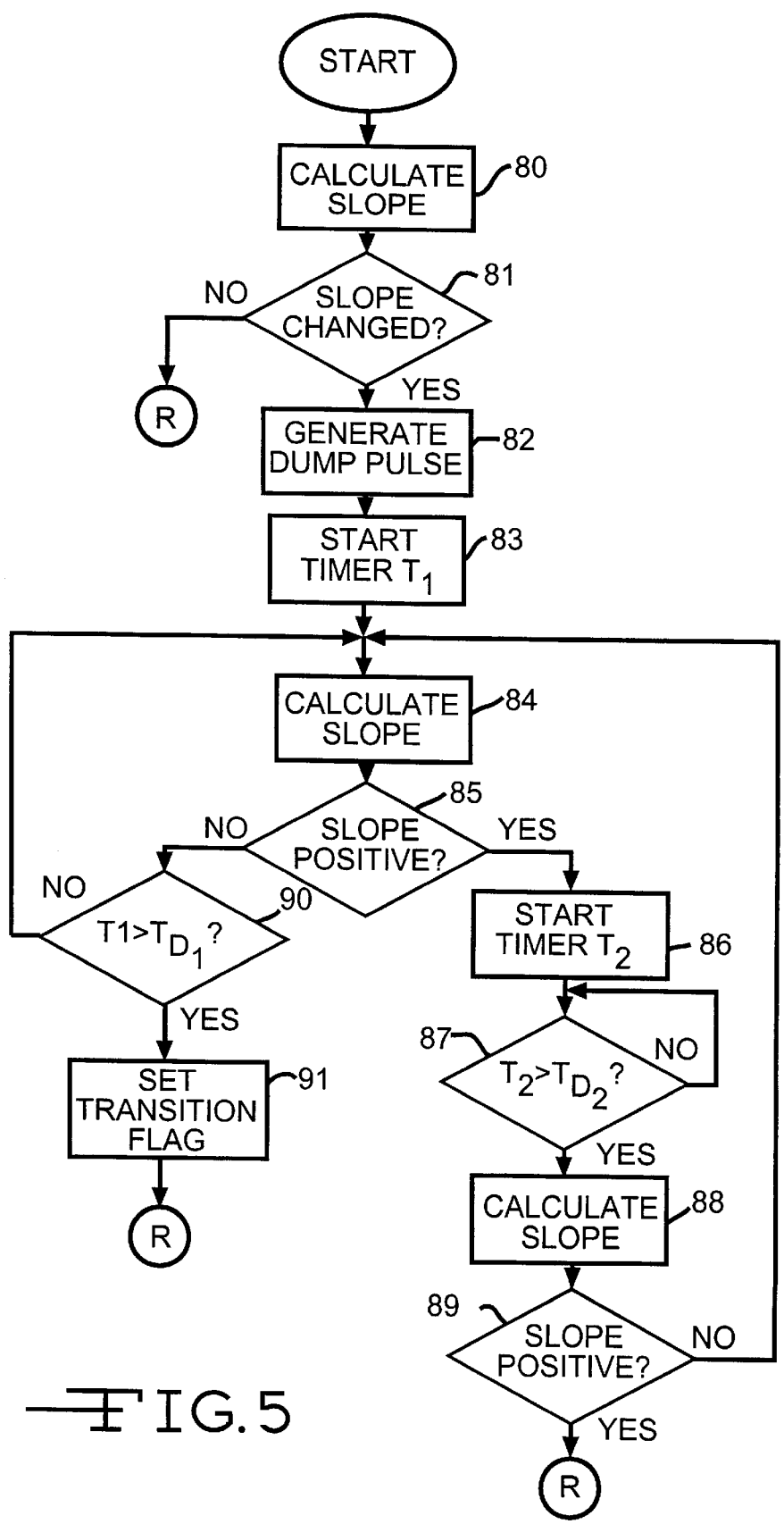
FIG. 5 is a more detailed flow chart for a subroutine to implement the present invention.

A more detailed flow chart for a subroutine for implementing the invention is shown in FIG. 5. As above, the flow chart shown in FIG. 5 is intended to be exemplary and the invention can be implemented with other subroutines which differ from the structure shown in the flow chart in FIG. 4. In decision block 80, the subroutine calculates the slope of the controlled rear wheel velocity curve. In decision block 81 the slope is subtracted from the previously calculated slope and the difference compared to a predetermined slope threshold. If the difference is less than the slope threshold, the subroutine returns to the main RWAL control program. If the difference is greater than the slope threshold, the subroutine continues to functional block 82 where the test dump pulse is generated. As indicated above, the mechanism for generating the dump pulse can vary. For example, a flag can be set in functional block 82 after which the subroutine returns to the RWAL control program where the actual dump pulse is generated. The RWAL control program would then return to the subroutine. Alternately, the subroutine could directly cause the test dump pulse to be generated. After the test pulse is generated, a first counter $T_1$ is initiated in functional block 83.

Following initiation of timer $T_1$, the slope of the rear wheel speed curve is again calculated in functional block 84. The calculated slope is compared to a previous value in decision block 85. If the slope is positive, the controlled rear wheel is accelerating and the subroutine transfers to functional block 86 and initiates a second timer $T_2$. At this point, both timers, $T_1$ and $T_2$, are running. The program continues to decision block 87 where the second timer $T_2$ is compared to the second predetermined time period $T_{D2}$. If the second predetermined time period $T_{D2}$ has not elapsed, the subroutine remains in a loop until the second predetermined time period has run. Upon expiration of the second predetermined time period $T_{D2}$, the subroutine transfers to functional block 88 where the slope of the rear wheel speed curve is calculated again. The slope calculated in functional block 88 is compared to the earlier slope in decision block 89. If the slope has not remained positive during the second predetermined time period, a false wheel speed acceleration has occurred, such as, for example, the short acceleration which can follow the wheel striking a bump in the road. Accordingly, the subroutine returns to functional block 84 to continue to monitor the slope of the rear wheel speed curve for the remainder of the first predetermined time period. If, in decision block 89, the slope of the rear wheel speed curve remained positive for the second predetermined time period $T_{D2}$, the subroutine has detected a wheel speed sneakdown condition, as illustrated in FIG. 3D. Accordingly, the subroutine returns to the RWAL control program.

If the slope of the rear wheel speed curve is not positive in decision block 85, the subroutine transfers to decision block 90 where the first counter $T_1$ is checked to determine if the first predetermined time period $T_{D1}$ has elapsed. If the first predetermined time period $T_{D1}$ has not elapsed, the subroutine returns to functional block 84 and continues to monitor the controlled rear wheel speed curve for a positive slope. If the first predetermined time period $T_{D1}$ has elapsed in decision block 90, the lack of a positive slope during the first predetermined time period $T_{D1}$ is an indication that the vehicle has transitioned from a low to a high mu road surface. Accordingly, the subroutine transfers to functional block 91 where a surface transition flag is set. The subroutine then returns to the RWAL control program. The RWAL control algorithm is responsive to a set transition flag to generate a series of rear wheel departures as described above. Following the wheel speed departures, the braking torque of the rear wheel brakes will be greater than before the rear wheel departures.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An anti-lock brake system for a vehicle having at least one rear wheel brake connected to a master cylinder, the anti-lock brake system comprising:
   an isolation valve connected between the master cylinder and a controlled rear wheel brake;
   a dump valve connected to said controlled rear wheel brake;
   a speed sensor for monitoring the speed of a rear wheel associated with said controlled rear wheel brake;
   a controller electrically coupled to said isolation and dump valves and said speed sensor; said controller being operative upon detecting a potential lock-up condition of the controlled rear wheel brake, to selectively operate said isolation and dump valves to correct said potential rear wheel lock-up, said controller being further operative, after detecting a potential transition from a low mu road surface to a high mu road surface following said correction, to hold said isolation valve closed and selectively open said dump valve and while monitoring the rear wheel speed to determine whether the vehicle has actually transitioned from said low mu road surface to said high mu road surface.

2. The anti-lock brake system according to claim 1 wherein said controller monitors the rear wheel speed over a first predetermined time period which commences with said opening of said dump valve and further wherein an acceleration of said rear wheel which occurs after said opening of said dump valve and which continues for a second predetermined time period is indicative of a false transition from a low mu road surface to a high mu road surface.

3. The anti-lock brake system according to claim 2 wherein an absence of acceleration of said rear wheel during said first predetermined time period is an indication that a true transition from a low mu road surface to a high mu road surface occurred.

4. The anti-lock brake system according to claim 3 wherein said controller is further operative upon determination that a true transition from a low mu road surface to a high mu road surface has occurred to selectively open said isolation valve to cause a first wheel speed departure and then to selectively open said dump valve to correct said first wheel speed departure, whereby the hydraulic brake pressure applied to the controlled wheel brake after said first wheel speed departure is greater than the hydraulic brake pressure applied to the controlled wheel brake before said first wheel speed departure.

5. The anti-lock brake system according to claim 4 wherein said controller is further operative following correction of said first wheel speed departure to selectively open said isolation valve to cause a second wheel speed departure and then to selectively open said dump valve to correct said second wheel speed departure, whereby the hydraulic brake pressure applied to the controlled wheel brake after said second wheel speed departure is greater than the hydraulic brake pressure applied to the controlled wheel brake before said second wheel speed departure.

6. The anti-lock brake system according to claim 1 wherein an absence of acceleration of said rear wheel during said first predetermined time period is an indication that a true transition from a low mu road surface to a high mu road surface occurred.

7. The anti-lock brake system according to claim 6 wherein said controller is further operative upon determination that a true transition from a low mu road surface to a high mu road surface has occurred to selectively open said isolation valve to cause a first wheel speed departure and then to selectively open said dump valve to correct said first wheel speed departure, whereby the hydraulic brake pressure applied to the controlled wheel brake after said first wheel speed departure is greater than the hydraulic brake pressure applied to the controlled wheel brake before said first wheel speed departure.

8. The anti-lock brake system according to claim 7 wherein said controller is further operative following correction of said first wheel speed departure to selectively open said isolation valve to cause a second wheel speed departure an d then to selectively open said dump valve to correct said second wheel speed departure, whereby the hydraulic brake pressure applied to the controlled wheel brake after said second wheel speed departure is greater than the hydraulic brake pressure applied to the controlled wheel brake before said second wheel speed departure.

9. The anti-lock brake system according to claim 1 wherein continuing deceleration of said rear wheel during said first predetermined time period is an indication that a true transition from a low mu road surface to a high mu road surface occurred.

10. The anti-lock brake system according to claim 9 wherein said controller is further operative upon determination that a true transition from a low mu road surface to a high mu road surface has occurred to selectively open said isolation valve to cause a first wheel speed departure and then to selectively open said dump valve to correct said first wheel speed departure, whereby the hydraulic brake pressure applied to the controlled wheel brake after said first wheel speed departure is greater than the hydraulic brake pressure applied to the controlled wheel brake before said first wheel speed departure.

11. The anti-lock brake system according to claim 10 wherein said controller is further operative following correction of said first wheel speed departure to selectively open said isolation valve to cause a second wheel speed departure and then to selectively open said dump valve to correct said second wheel speed departure, whereby the hydraulic brake pressure applied to the controlled wheel brake after said second wheel speed departure is greater than the hydraulic brake pressure applied to the controlled wheel brake before said second wheel speed departure.

* * * * *